Patented Oct. 18, 1949

2,484,841

UNITED STATES PATENT OFFICE 2,484,841

REDUCTION OF HYDROPEROXIDES

Eugene J. Lorand, Wilmington, Del., assignor to Hercules Powder Company, Wilmington, Del., a corporation of Delaware No Drawing. Application May 14, 1947,
Serial No. 748,121

14 Claims. (Cl. 260—618)

This invention relates to the preparation of alcohols and, more particularly, to the process of converting organic hydroperoxides to the corresponding alcohols.

It has been known that organic hydroperoxides could be converted to the corresponding alcohols through use of various reducing agents. However, the reducing agents previously utilized by the art have been disadvantageous in that they have been inefficient in effecting the desired reduction and have not been capable of use in neutral or moderately alkaline media. The latter fact has been particularly disadvantageous when it has been desired to reduce hydroperoxides which were unstable in acid media.

Now in accordance with this invention, it has been found that organic hydroperoxides may be reduced to the corresponding alcohols utilizing as reducing agents alkali metal sulfides, alkaline earth metal sulfides, and mixtures of these sulfides.

In carrying out the process in accordance with this invention an aqueous solution of sodium sulfide, for example, is charged into a reaction vessel equipped with an efficient agitator and a condenser and there then is introduced into the reaction vessel an organic hydroperoxide such as $\alpha,\alpha$-dimethylbenzyl hydroperoxide. An exothermic reaction takes place between the sulfide and the hydroperoxide, resulting in the reduction of the hydroperoxide to $\alpha,\alpha$-dimethylbenzyl alcohol. Upon completion of the reduction, the reaction mixture is permitted to separate into two phases and the oily phase is removed, washed with water, and the alcohol purified further by conventional refining procedures.

The following examples constitute specific embodiments of the invention. All parts are on a parts by weight basis.

EXAMPLE 1

The hydroperoxide material used in this example was the crude reaction mixture obtained by oxidizing cumene with commercial oxygen in the presence of an aqueous alkaline phase at 90° C. and containing 48.7% $\alpha,\alpha$-dimethylbenzyl hydroperoxide upon termination of the oxidation reaction.

One hundred ninety-five parts of commercial sodium sulfide in pellets (60% $Na_2S$) was dissolved in 800 parts of water and the resulting solution filtered through a layer of diatomaceous earth. The clear sodium sulfide solution then was placed in a reaction vessel equipped with an agitator, thermometer, condenser, and an inlet for the hydroperoxide-containing material. A total of 1874 parts of the hydroperoxide-containing material was introduced in portions of approximately 200 parts each into the reaction vessel, the rate of introduction being about 0.5 hour per 200 parts. The exothermic reaction which took place raised the temperature to about 50° C. during the first addition. The second portion was introduced at such a rate that the temperature of the reaction mixture remained at 50° to 60° C. In the course of the next addition a temperature of 60° to 65° C. was maintained by a warm water bath held at 10° to 20° C. lower than the temperature of the reaction mixture. As subsequent portions were added this difference in temperature between the water bath and that of the reaction mixture was gradually diminished, and at the same time the reaction temperature was gradually increased until it reached 85° C. at the time of the last hydroperoxide addition. A temperature of 85° C. then was maintained for another two hours. With the exception of the first portion of hydroperoxide-containing material introduced, prior to addition of each succeeding portion, a sample of the oily phase was taken from the reaction mixture for the purpose of determining the hydroperoxide content. This was determined by the well-known iodine liberation method which involved adding the sample to an acidified potassium iodide solution and noting the amount of iodine liberated. The values obtained ranged from 1.5 to 6.4 grams hydroperoxide per 100 milliliters of the liquid sample.

Upon completion of the reduction, the aqueous and oily phases were allowed to separate into individual layers, the layers separated, and the oily layer was washed consecutively with 300 parts of water, 300 parts of 2% aqueous sodium hydroxide, and 300 parts of water. The washed oils were then stripped of unreacted cumene in a column packed with stainless steel helices. There was obtained 710 parts of a light-colored residue containing about 2 to 3% high-boiling material, 8 to 9% acetophenone, and the remainder $\alpha,\alpha$-dimethylbenzyl alcohol (yield based on amount of hydroperoxide originally present, about 77%).

EXAMPLE 2

The procedure of Example 1 was followed using 1562 parts of a reaction mixture obtained from the oxidation of cumene with oxygen and containing 58.4% $\alpha,\alpha$-dimethylbenzyl hydroperoxide. Table I shows the details of this reduction.

Table I

| Hours From Start | Hydroperoxide Introduced, Parts | Temperature, °C. Reaction Mixture | Temperature, °C. Bath | Hydroperoxide Content, g./100 ml. |
|---|---|---|---|---|
| 0.75 | 193 | 25–50 | No Bath | 0.7 |
| 1.50 | 193 | 50–60 | No Bath | 0.7 |
| 2.25 | 193 | 55–63 | 55 | 0.8 |
| 3.00 | 193 | 63–71 | 55–60 | 1.1 |
| 3.75 | 193 | 69–76 | 60–70 | 4.4 |
| 4.50 | 193 | 75–80 | 75 | 5.6 |
| 5.25 | 193 | 75–80 | 75–80 | 5.8 |
| 6.00 | 211 | 85 | 80–85 | 6.6 |
| 6.30 | (¹) | 80–85 | 80–85 | 4.1 |

¹ 10 parts Na₂S in 40 parts water.

As shown in Table I, an additional 10 parts of sodium sulfide dissolved in 40 parts of water was added after all of the hydroperoxide-containing material had been added to the reaction vessel. Each addition of the hydroperoxide-containing material was spaced over a period of 30 minutes and following each addition a period of 10 minutes was permitted to elapse before the sample of the oily phase was removed for determination of hydroperoxide content.

Upon completion of the reduction, the reduced oils were separated from the aqueous layer and washed with 200 parts of water. A total of 1425 parts of washed oils was obtained, these oils containing 0.3 gram of hydroperoxide per 100 milliliters of oily material, and 3.9% acetophenone. The reduced oils next were stripped of unreacted cumene, resulting in the recovery of 756 parts of residue which on rapid distillation at 19 millimeters pressure gave 704 parts (87% yield) of a water-while liquid distillate that crystallized at room temperature when seeded with a crystal of $\alpha,\alpha$-dimethylbenzyl alcohol. The 21 parts of distillation residue contained needle-shaped crystals of 2,3-dimethyl-2,3-diphenyl butane.

EXAMPLE 3

Two hundred ninety-one parts of sodium sulfide was dissolved in 873 parts of water and the solution filtered as in Example 1. Following the procedure of Example 1, 1950 parts of a reaction mixture obtained from the oxidation of cumene with oxygen and containing 62.5% $\alpha,\alpha$-dimethylbenzyl hydroperoxide was added to the well-agitated sodium sulfide solution in nine equal portions while the temperature of the reaction mixture was kept nearly constant at 78° to 85° C. by means of a water bath. The time of adding each portion varied from 15 to 35 minutes, depending on the heat evolution and temperature of the water bath, the latter varying from 70° to 85° C. During the first addition, the bath was removed and the initial reaction temperature of 80° C. was maintained by the heat of reaction. After the last addition, the reaction mixture was further agitated and heated at 80° to 85° C. for six hours, at the end of which time the hydroperoxide content had dropped to 0.6 gram per 100 milliliters of material tested. After drawing off the aqueous layer, the reduced oils were washed with 200 parts of water, 200 parts of 2% aqueous sodium hydroxide, and again with 200 parts of water. The product was stripped of unreacted cumene at 50 millimeters per square centimeter pressure. The 1140 parts residue contained 5.8% acetophenone and about 2 to 3% impurities. The approximately 1040 parts of $\alpha,\alpha$-dimethylbenzyl alcohol represented a yield of about 95% based on the amount of hydroperoxide originally present.

EXAMPLE 4

A solution of 82 parts of commercial sodium sulfide in 330 parts of water was filtered through a bed of filter aid and charged into an apparatus similar to that described in Example 1. While maintaining vigorous agitation, 1092 parts of a reaction product obtained by oxidizing p-diisopropylbenzene with oxygen and containing 49.2% of $\alpha,\alpha$-dimethyl-p-isopropylbenzyl hydroperoxide was allowed to drip into the sodium sulfide solution. About one-half of the oxidized diisopropylbenzene was introduced over a period of 1¼ hours, during which time the heat of reaction raised the temperature from 20° to about 54° C. The remainder of the oxidized diisopropylbenzene then was added in about three hours, the temperature being gradually raised to 80° C. by the application of outside heat. Since at the end of this time the hydroperoxide content of the oily layer was still 19%, there was introduced into the reaction vessel 55 parts of sodium sulfide dissolved in 165 parts of water, the temperature being maintained at 80° to 90° C. for an additional 16 hours, agitation also being continued during this period. The hydroperoxide content then was 1.2%. After cooling the reaction mixture, the aqueous layer was drawn off and the reduced oils were washed with water, 2% aqueous sodium hydroxide, and again with water, using 110 parts of each. The product was fractionally distilled in a 20-plate packed column at a pressure of 23 millimeters per square centimeter. Following the removal of a forerun of low boiling material, there was obtained 488 parts of a fraction distilling at 127° to 135° C. and consisting mainly of $\alpha,\alpha$-dimethyl-p-isopropylbenzyl alcohol. The 488 parts of the alcohol was more than could be obtained stoichiometrically from the hydroperoxide content, the difference being due to the presence of some of the alcohol in the original oxidized diisopropylbenzene.

EXAMPLE 5

Fifty-six and one-half parts of sodium sulfide flakes (59–60% grade) was dissolved in 180 parts of water and the solution charged into a reaction vessel similar to that utilized in Example 1. To the sodium sulfide solution then was slowly added 180 parts of hydroperoxide (1-cyclohexene 3-hydroperoxide) prepared by the oxidation of cyclohexene with commercial oxygen in diffuse daylight followed by distillation to remove the unreacted cyclohexene, the distillation being carried out at reduced pressure at a temperature of about 50° C. During addition of the hydroperoxide the temperature of the reaction mixture at first rose to 60° C. and then remained between 60° and 70° C. to the end of the reaction, which took about two hours. Completion of the reaction was ascertained by determining the hydroperoxide content of the reduced product. The aqueous layer then was removed and the oily layer subjected to fractional distillation at a pressure of 50 to 55 millimeters per square centimeter. There was recovered 86 parts (about 56% yield based on the hydroperoxide) of 1-cyclohexen-3-ol.

EXAMPLE 6

A solution of 20 parts of sodium sulfide flakes (59–60% grade) in 70 parts of water was charged into a reaction vessel similar to that used in Example 1. In 100 parts of benzene there then was dissolved 100 parts of the crystalline hydroperoxide (1,2,3,4-tetrahydronaphthalene 1-hydroperoxide) obtained by the noncatalytic oxidation of tetrahydronaphthalene (tetralin) with commercial oxygen at about 70° C. The benzene solution then was allowed to flow as a thin stream into the sodium sulfide solution while maintaining vigorous agitation. The temperature of the reaction mixture rose to 60° C. and was then maintained at 60° to 70° C., first by slight cooling and later, after two-thirds of the hydroperoxide solution had been introduced, by external heating. Approximately one hour following addition of the benzene solution of the hydroperoxide, the hydroperoxide content was determined and found to be 6.0 grams hydroperoxide per 100 milliliters of sample tested. An additional three parts of dry sodium sulfide was added to the reaction mixture and heating and agitation were resumed. At the end of three hours, the hydroperoxide content was 0.5 gram per 100 milliliters. The aqueous layer then was removed and the oily layer washed twice with water using about 100 parts for each wash. The benzene solvent then was removed from the oily reaction product by distillation at a pressure of 200 millimeters per square centimeter. Upon lowering the distillation pressure to 20 millimeters per square centimeter some lower boiling constituents also were removed by distillation, the final pot temperature being 130° C. There was recovered a residue consisting of 83 parts of essentially pure 1,2,3,4-tetrahydro-1-naphthol, this representing a yield of about 92% based on the amount of hydroperoxide originally utilized.

EXAMPLE 7

Two hundred parts of 10% aqueous sodium hydroxide was placed in a reaction vessel equipped with an efficient agitator, thermometer, and a reflux condenser. After raising the temperature of the sodium hydroxide solution to about 80° C., four parts of sulfur was added with agitation. When the sulfur had dissolved there was added to the reaction vessel about 100 parts of a reaction product obtained by the oxidation of cumene with commercial oxygen and containing 46.2% $\alpha,\alpha$-dimethylbenzyl hydroperoxide. The hydroperoxide was added slowly and the temperature maintained at 80° to 85° C. When the yellow color of the reaction mixture had largely disappeared, another four parts of sulfur was added followed by the introduction of another 100 parts of the hydroperoxide material. Upon completion of addition of this portion of the hydroperoxide material, there were added to the reaction vessel 50 parts of 25% aqueous sodium hydroxide and four parts of sulfur. The remaining hydroperoxide material was introduced over a period of about two hours and upon completion of the addition, agitation was continued for about five hours, the reaction temperature being maintained at 80° to 90° C. At the end of this time a sample of the oily layer was tested for hydroperoxide content and found to contain 1.5 grams of hydroperoxide per 100 milliliters of sample. The aqueous and oily layers were separated and the oily layer washed with 100 parts of water and 100 parts of 2% aqueous sodium hydroxide. There was recovered 277 parts of crude product containing 48.7% $\alpha,\alpha$-dimethylbenzyl alcohol and 4.2% acetophenone. The amount of alcohol was more than could be obtained stoichiometrically from the amount of hydroperoxide originally present, the difference being due to the presence of a certain amount of alcohol in the originally oxidized cumene.

EXAMPLE 8

Forty-two and three-tenths parts of commercial sodium sulfide (60% Na₂S) was dissolved in about 240 parts of ethyl alcohol. Following the procedure of Example 1, 300 parts of a reaction mixture obtained by the oxidation of cumene with oxygen and containing 62.6% $\alpha,\alpha$-dimethylbenzyl hydroperoxide was added to the well-agitated sodium sulfide solution over a period of one hour at a temperature of 68° C. Upon completion of addition of the hydroperoxide-containing material, agitation was continued and the reaction mixture was heated for an additional 2.5 hours, the temperature being allowed to rise gradually to 83° C. The reaction mixture then was cooled and filtered and the filtrate stripped of ethyl alcohol and unreacted cumene in a bead-packed column operating at a pressure of 17 millimeters. The stripping operation was completed at a temperature of 93° C. and the 147 parts of residue had a refractive index of 1.5225 (20° C.) and contained 0.07–0.08% $\alpha,\alpha$-dimethylbenzyl hydroperoxide and 92.3% $\alpha,\alpha$-dimethylbenzyl alcohol. Based on the amount of hydroperoxide originally present, the yield of $\alpha,\alpha$-dimethylbenzyl alcohol was 84.5%.

EXAMPLE 9

Thirty-seven and one-half parts of 50% calcium sulfide was dissolved in about 150 parts of water, and following the procedure of Example 1 there was added to the resulting solution 300 parts of a reaction mixture obtained by the oxidation of cumene with oxygen and containing 52.2% $\alpha,\alpha$-dimethylbenzyl hydroperoxide. The addition was carried out over a period of 1.5 hours at a temperature of 68° C. As in Example 8, the reaction mixture was heated for an additional 2.5 hours, the temperature rising to 93° C. After cooling, the reduced oils were separated from the aqueous layer, washed once with about 300 parts of water and once with about 300 parts of 2% aqueous sodium hydroxide, and stripped as in Example 8 of the unreacted cumene until the vapor temperature reached 91° C. at 17 millimeters pressure. The 146.3 parts residue had a refractive index of 1.5229 (20° C.) and contained 2.1% $\alpha,\alpha$-dimethylbenzyl hydroperoxide and 85.9% $\alpha,\alpha$-dimethylbenzyl alcohol. Based on the amount of original hydroperoxide, the yield of alcohol was 89.7%.

EXAMPLE 10

Forty-two and three-tenths parts of fused, technical grade sodium polysulfide (Eimer and Amend) was dissolved in about 150 parts of water, and following the procedure of Example 1 there was added to the resulting solution 300 parts of the hydroperoxide-containing material of Example 9 over a period of two hours at a temperature of 67° C. The reaction mixture was heated, with agitation, for an additional 1.5 hours, the temperature rising to 81° C. After cooling, the aqueous and oily phases were separated, the oily layer washed with about 100 parts of 2% aqueous sodium hydroxide and stripped as in Example 8 of the unreacted cumene until the vapor temperature reached 91° C. at 20 millimeters pressure. The 186.5 parts residue had a refractive index of 1.5234 (20° C.), contained no α,α-dimethylbenzyl hydroperoxide, and contained 85.1% α,α-dimethylbenzyl alcohol. The amount of alcohol was more than could be obtained stoichiometrically from the hydroperoxide content, the difference being due to the presence of some of the alcohol in the original oxidized cumene.

EXAMPLE 11

Following the procedure of Example 1, there was added to an agitated solution of 10.7 parts of commercial sodium sulfide (60% Na₂S), dissolved in about 40 parts of water, 323 parts of a reaction mixture obtained by the oxidation of p-cymene with oxygen and containing 13.7% α,α-dimethyl-p-methylbenzyl hydroperoxide. The addition was carried out over a period of ten minutes at a temperature of 50° C., then the reaction mixture was heated, with agitation, for seven hours, the temperature rising to 90° C. At the end of this time the hydroperoxide content was 1.4%. The reaction mixture was cooled, the oily and aqueous phases separated, and the oils washed with three portions of 2% aqueous sodium hydroxide, each portion constituting about 150 parts. The washed oils, constituting 290 parts, were distilled through a packed column, resulting in the recovery of 271 parts total of p-cymene, p - methylacetophenone and α,α-dimethyl-p-methylbenzyl alcohol. Of the total 271 parts, 218.8 parts (81%) was p-cymene having a refractive index of 1.4898 (20° C.) and a boiling point of 176–177° C. at atmospheric pressure, 6.2 parts (2%) was p-methylacetophenone having a refractive index of 1.5344 (20° C.) and a boiling point of 112° C. at 11 millimeters pressure, and 46 parts (17%) was α,α-dimethyl-p-methylbenzyl alcohol having a refractive index of 1.5162 (20° C.) and a boiling point of 109° C. at 15 millimeters pressure.

EXAMPLE 12

Forty-seven and four-tenths parts of commercial sodium sulfide (60% Na₂S) was dissolved in about 200 parts of water, and following the procedure of Example 1 there was added to the resulting solution 200 parts of a t-butyl alcohol solution of t-butyl hydroperoxide (2-methyl-propyl 2-hydroperoxide), the alcohol solution containing 55.9% of the hydroperoxide (Union Bay State Co.). The addition was carried out over a period of 2.3 hours at a temperature of 26° C. The reaction mixture was heated, with agitation, for an additional 4.7 hours, the temperature being allowed to rise gradually to 46° C. The reaction mixture was cooled and saturated with sodium chloride, resulting in the separation of the alcohol layer. After drying the alcohol layer over anhydrous calcium sulfate there was obtained 172 parts of t-butyl alcohol having a refractive index of 1.3878 (20° C.), a density of 0.7999 at 25° C. as compared to water at 15.6° C., and a boiling point of 79.2° C. at atmospheric pressure. The t-butyl alcohol contained a minor amount (2.8%) of t-butyl hydroperoxide. Based on the amount of the t-butyl hydroperoxide in the original t-butyl alcohol solution, the yield of t-butyl alcohol by the sodium sulfide reduction was 95%.

The process in accordance with this invention has been shown by the examples as applied to α,α-dimethylbenzyl hydroperoxide, α,α-dimethyl-p - methylbenzyl hydroperoxide, α,α - dimethyl-p-isopropylbenzyl hydroperoxide, α,α-cyclohexene 3-hydroperoxide, 1,2,3,4-tetrahydronaphthalene 1-hydroperoxide, and t-butyl hydroperoxide. The process, however, is applicable to any organic hydroperoxide. In general, the hydroperoxides may be considered as the alkyl, cycloalkyl, aralkyl or arcycloalkyl substitution products of hydrogen peroxide and may be represented by the formula: ROOH in which R may be an open alkyl chain, straight or branched, or a cycloaliphatic radical. Furthermore, R may be an aralkyl radical containing alkylated benzene, naphthalene, anthracene and phenanthrene rings, or an arcycloalkyl radical such as that containing fused aromatic and cycloaliphatic rings. In addition to the hydroperoxides shown by the examples other hydroperoxides such as t-amyl hydroperoxide, cuminyl hydroperoxide, α,α,α',α'-tetramethyl-p-xylylene dihydroperoxide, and α,α-ethylmethylbenzyl hydroperoxide may be mentioned as operable.

The process of this invention is particularly useful when applied to the reduction of α,α-dialkylarylmethyl hydroperoxides to the corresponding alcohols since these hydroperoxides are somewhat unstable in media other than neutral or alkaline media. The α,α-dialkylarylmethyl hydroperoxides may be prepared by the oxidation of alkyl-substituted aromatic compounds having the structural formula

in which R₁ and R₂ represent alkyl groups and Ar represents a substituent selected from the group consisting of aryl and alkaryl groups. The oxidation may be carried out in the liquid phase utilizing air or molecular oxygen as the oxidizing agents. A preferred method of preparing these hydroperoxides involves the liquid phase oxidation of the alkyl-substituted aromatic organic compounds having the above structural formula by passing an oxygen-containing gas through the compounds at a temperature between about 25° and about 95° C. in the presence of an aqueous alkali. The concentration of the alkali may be between about 1 and about 35% although it is preferable to use concentrations of about 2 to about 8%. Vigorous agitation is desirable during the oxidation reaction.

As illustrative of the alkyl-substituted aromatic organic compounds which may be oxidized, p-cymene, cumene, and p-diisopropylbenzene may be mentioned. These compounds lead to α,α-dimethyl-p-methylbenzyl, α,α-dimethylbenzyl, and α,α-dimethyl-p-isopropylbenzyl hydroperoxides, respectively. Also, in the case of p-diisopropylbenzene, there may be obtained α,α,α',α'-tetramethyl-p-xylylene dihydroperoxide. The aryl and substituted aryl groups need not be derived from benzene as is the case in the afore-mentioned compounds, for compounds containing aromatic nuclei derived from naphthalene, anthracene, phenanthrene, and the like, also are operable, dissolved, if necessary, in a suitable solvent during the oxidation. The aryl group may be substituted with alkyl groups such as methyl, ethyl, propyl, isopropyl, butyl, isobutyl, secondary butyl, tertiary butyl, and the like to give alkaryl substituents, the same alkyl groups also being representative of R₁ and R₂ in the structural formula. R₁ and R₂ may be either the same or different.

In order to produce the alcohols according to this invention the hydroperoxides may be used either in the pure form or diluted with solvents. When, for example, the hydroperoxides are obtained by oxidation of hydrocarbons, the oxidation usually is interrupted before all of the hydrocarbon has reacted in order to avoid or limit side reactions. In this manner the hydroperoxide is obtained in mixture with smaller or larger amounts of the original hydrocarbon, and the mixture also may contain secondary reaction products such as alcohols, ketones, and the like. It is not necessary to isolate, separate, or even concentrate the hydroperoxide from such a reaction mixture since the reduction can be carried out directly in the reaction mixture. The hydroperoxide-containing mixture may even be diluted further by addition of an inert solvent. In case it is desirable, however, the hydroperoxide may be separated from the other constituents of the reaction mixture by, for example, fractional distillation at very low pressures, of the order of 0.01 to 1.0 millimeter per square centimeter, the hydroperoxides having higher boiling points than the related hydrocarbon, alcohol, and ketone. In some cases the hydroperoxide also may be separated from the oxidation reaction mixture by crystallization, which may be facilitated by first distilling off at least part of the hydrocarbon. In the case of those hydroperoxides such as that derived from tetrahydronaphthalene, which are solids, it may be advantageous to dissolve the hydroperoxide in an inert solvent such as benzene, toluene, and the like.

The examples have shown the use of sodium sulfide, calcium sulfide and sodium polysulfide as reducing agents, but other alkali metal and alkaline earth metal sulfides may be used, as well as mixtures of any of the sulfides. Exemplary of other operable sulfides are those of potassium, lithium, barium, and magnesium. Instead of the monosulfides, such as sodium monosulfide, there also may be used the polysulfides such as sodium disulfide, sodium trisulfide, sodium tetrasulfide and commercial polysulfides, which usually are mixtures of the various polysulfides, particularly in those instances wherein aqueous sodium hydroxide also is included in the reaction mixture. Another type of operable sulfide is a hydrosulfide such as sodium hydrosulfide, and such a sulfide may be used either alone or with a caustic alkali such as aqueous sodium hydroxide. The use of an aqueous alkali is desirable when the tertiary hydroperoxide to be reduced is unstable in an acid medium.

The sodium sulfide may be used in the form of any commercial grade, such as that containing nine molecules of water of crystallization or that existing in flake form of 59 to 60% Na₂S content. Although the sodium sulfide may be used either as the solid material or in solution in a suitable solvent such as ethyl alcohol, it is preferable to use the sodium sulfide in an aqueous solution, the strength of which may vary from a few per cent to that of the saturated solution (15% at 10° C., 52% at 90° C.). It also is possible to use part of the sodium sulfide in solution and part of it in the solide state. Too, as shown by Example 7, the sodium sulfide may be generated in situ by the reaction of aqueous sodium hydroxide upon sulfur. It is most desirable, however, to use the sodium sulfide in the form of a 10 to 20% aqueous solution based on pure Na₂S content. Usually an excess of sodium sulfide is needed to complete the reduction, this excess varying from about 10 to about 50%, depending on the nature of the hydroperoxide, the concentration of the hydroperoxide, the temperature, the efficiency of agitation, and the like, but it is possible to reduce or even eliminate the use of an excess by operating the process as a countercurrent process in which fresh sodium sulfide solution is contacted with a hydroperoxide mixture already appreciably reduced and contacting fresh hydroperoxide with a partially exhausted sodium sulfide solution. The same general facts apply to the other sulfides which are operable in accordance with this invention.

The examples have shown the addition of the hydroperoxide to the sulfide solution. This procedure was followed due to the fact that the reduction reaction is exothermic and that it therefore is desirable to maintain a low concentration of the hydroperoxide at any one time. The process is operable, however, if carried out by adding the sulfide to the hydroperoxide, but care must be taken that the reaction does not proceed too vigorously. It is preferable to allow the hydroperoxide to run into the sulfide solution at a rate that insures rapid reduction but that does not allow the hydroperoxide content of the reaction mixture to exceed a safe limit. This limit is not critical, but it is preferably below about 8 to about 10%.

The temperature of the reaction may be varied from about 0° to about 100–110° C., the latter temperatures being in the range of the boiling point of an aqueous sodium sulfide solution, depending upon the concentration of the solution. It is preferable, however, that temperatures above 20° C. be utilized, and that the temperatures also be below the boiling point of the aqueous phase in case an aqueous sulfide solution is utilized. A desirable temperature range is between about 30° and about 95° C. and a particularly applicable range is from about 60° to about 85° C. It is feasible to start the reaction at a temperature of about 20° C. and allow the heat of reaction to raise the temperature to the desired level, for example, 60° to 85° C., at which temperature it can be maintained by cooling or heating, depending mainly on the hydroperoxide and sulfide concentrations.

It is necessary from time to time to check the hydroperoxide content in the reaction mixture. This can be carried out utilizing the well-known iodine liberation method which involves removal of a sample of the oily phase from the reaction vessel and adding this sample to an acidified potassium iodide solution and noting the amount of iodine which is liberated. Upon completion of the reaction the hydroperoxide content should not exceed a rather low limit which will vary depending upon the nature of the hydroperoxide but generally falls within the range of 0 to about 3%. Upon completion of the reduction the reaction mixture may be worked up by well-known procedures. When, for example, an aqueous sulfide solution has been used, it usually is desirable to separate the aqueous and oily phases and wash the latter repeatedly with water, or with water and an aqueous alkali. The oily phase then may be further purified by processes involving fractional distillation, crystallization, and the like, depending on the nature of the alcohol and the admixed substances. When the sulfide has been dissolved in a solvent such as ethanol, the latter may be removed from the reaction mixture by distillation.

The process in accordance with this invention provides an efficient and economical means for the preparation of alcohols. It is particularly useful in those instances in which the alcohols have been difficultly obtained by other processes. By oxidizing a hydrocarbon and proceeding through the hydroperoxide as intermediate, it often is possible to obtain, using the process of this invention, the alcohol more easily and economically than would otherwise be possible. The sulfides used as reducing agents in accordance with this invention are advantageous in that one molecule of the sulfide is capable of reducing four molecules of the hydroperoxide, this being in contrast to the other reducing agents which have been proposed. Of further advantage is the fact that the sulfides effectively reduce the hydroperoxides even when the latter are present in low concentrations. One of the main disadvantages of other reducing agents is that they are effective only at high hydroperoxide concentrations; when the hydroperoxide content drops below about 10%, the reduction with previously known reducing agents proceeds very slowly, if at all. Also, the sulfides react more vigorously than do other reducing agents such as metallic aluminum, zinc, or the like, and they may be used in neutral or moderately alkaline media. The latter is particularly important when hydroperoxides which are unstable in acid medium are to be reduced. Exemplary of such peroxides are those having the hydroperoxy group on a tertiary carbon which is adjacent to a phenyl or other aromatic group. The products obtained according to this invention find various commercial applications. For example, $\alpha,\alpha$-dimethyl-p-methylbenzyl alcohol is used in the essential oil industry as a perfume base for soaps. This compound also is an efficient frothing agent in the flotation of copper, zinc, and lead sulfide ores. $\alpha,\alpha$-Dimethylbenzyl alcohol has similar commercial applications. The dihydric alcohols such as those derived from diisopropylbenzene also are efficient frothing agents in heavy metal, especially lead sulfide, ore flotations. All of the alcohols are good wetting-out agents.

What I claim and desire to protect by Letters Patent is:

1. The process of preparing an alcohol which comprises reducing an organic hydroperoxide with at least one material of the group consisting of alkali metal sulfides and alkaline earth metal sulfides.

2. The process of preparing an alcohol which comprises reducing an organic hydroperoxide at a temperature between about 0° and about 110° C. with at least one material of the group consisting of alakli metal sulfides and alkaline earth metal sulfides.

3. The process of preparing an alcohol which comprises reducing an organic hydroperoxide at a temperature between about 30° and about 95° C. with at least one material of the group consisting of alkali metal sulfides and alkaline earth metal sulfides.

4. The process of preparing an alcohol which comprises reducing an organic hydroperoxide at a temperature between about 60° and about 85° C. with at least one material of the group consisting of alkali metal sulfides and alkaline earth metal sulfides.

5. The process of preparing an alcohol which comprises reducing an organic hydroperoxide with an alkali metal sulfide.

6. The process of preparing an alcohol which comprises reducing an organic hydroperoxide with sodium sulfide.

7. The process of preparing an $\alpha,\alpha$-dialkylarylmethyl alcohol which comprises reducing an $\alpha,\alpha$-dialkylarylmethyl hydroperoxide with at least one material of the group consisting of alkali metal sulfides and alkaline earth metal sulfides.

8. The process of preparing $\alpha,\alpha$-dimethylbenzyl alcohol which comprises reducing $\alpha,\alpha$-dimethylbenzyl hydroperoxide with at least one material of the group consisting of alkali metal sulfides and alkaline earth metal sulfides.

9. The process of preparing $\alpha,\alpha$-dimethylbenzyl alcohol which comprises reducing $\alpha,\alpha$-dimethylbenzyl hydroperoxide with an alkali metal sulfide.

10. The process of preparing $\alpha,\alpha$-dimethylbenzyl alcohol which comprises reducing $\alpha,\alpha$-dimethylbenzyl hydroperoxide with sodium sulfide.

11. The process of preparing $\alpha,\alpha$-dimethyl-p-methylbenzyl alcohol which comprises reducing $\alpha,\alpha$-dimethyl-p-methylbenzyl hydroperoxide with at least one material of the group consisting of alkali metal sulfides and alkaline earth metal sulfides.

12. The process of preparing $\alpha,\alpha$-dimethyl-p-methylbenzyl alcohol which comprises reducing $\alpha,\alpha$-dimethyl-p-methylbenzyl hydroperoxide with an alkaline earth metal sulfide.

13. The process of preparing $\alpha,\alpha$-dimethyl-p-methylbenzyl alcohol which comprises reducing $\alpha,\alpha$-dimethyl-p-methylbenzyl hydroperoxide with calcium sulfide.

14. The process of preparing $\alpha,\alpha$-dimethylbenzyl alcohol which comprises reducing $\alpha,\alpha$-dimethylbenzyl hydroperoxide at a temperature between about 60° and about 85° C. with an aqueous solution of sodium sulfide.

EUGENE J. LORAND.

REFERENCES CITED

The following references are of record in the file of this patent:

Hoch et al. (I), Berichte, vol. 75 (1942), pages 313–16 (4 pages).

Hoch et al. (II, Berichte, vol. 77 (1944), pages 257–264 (8 pages).